United States Patent [19]

Raymond et al.

[11] 3,909,784

[45] Sept. 30, 1975

[54] INFORMATION CODING WITH ERROR TOLERANT CODE

[75] Inventors: William R. Raymond, West Covina; Rafn Stefansson, San Marino, both of Calif.

[73] Assignee: Bell & Howell Company, Chicago, Ill.

[22] Filed: July 2, 1973

[21] Appl. No.: 376,056

[52] U.S. Cl.... 340/146.1 AV; 325/41; 340/146.1 F; 340/146.1 R; 360/53

[51] Int. Cl.[2] ...................... H03K 13/32; G06K 5/02; G11B 27/36; H04L 1/10

[58] Field of Search ............. 325/41; 340/146.1 AV, 340/146.1 F, 146.1 R, 174.1 B; 360/53

[56] References Cited

UNITED STATES PATENTS 3,614,631 10/1971 Be Vier ....................... 340/146.1 R

*Primary Examiner*—R. Stephen Dildine, Jr.
*Attorney, Agent, or Firm*—Benoit Law Corporation

[57] ABSTRACT

Information is expressed in the form of pulses which are arranged in accordance with the equation: $M_n=xn+T$ wherein: $n$ is the code number, M is the quantity of pulses per code number, T is the negative tolerance of pulse count, and $x$ is the sum of one plus the positive tolerance and the negative tolerance of pulse count.

17 Claims, 7 Drawing Figures

INFORMATION CODING WITH ERROR TOLERANT CODE

BACKGROUND OF THE INVENTION

1. Field of the Invention

The subject invention relates to methods of coding information, to coded information, and to apparatus for coding information.

2. Description of the Prior Art

Information is being coded for a wide variety of well-known reasons, including improved storage, transmission, recording and playback, and data processing.

Existing codes, coding techniques and coding systems are typically of a complex nature, placing them economically and technologically out of reach for many practical applications.

SUMMARY OF THE INVENTION

It is an object of this invention to overcome the above mentioned disadvantage of prior-art codes, coding techniques and coding systems.

It is a related object of this invention to provide error tolerant codes, coding techniques and coding systems.

It is a further object of this invention to provide methods and apparatus for recording and reproducing coded information in an error tolerant manner.

Other objects of this invention will become apparent in the further course of this disclosure.

From one aspect thereof, this invention resides in a method of recording information on a recording medium in an information recording and playback system wherein information pulses are erroneously deleted within a negative tolerance of pulse count of at least one and wherein spurious pulses are picked up within a positive tolerance of pulse count and wherein said information is expressed in the form of pulses. The invention according to this aspect resides, more specifically, in the improvement comprising, the steps of arranging these pulses in accordance with the equation and code:

$M_n = xn + T$, wherein: $n$ is the code number, M is the quantity of pulses per code number, T is the negative tolerance of pulse count, and $x$ is the sum of one plus the positive tolerance and the negative tolerance of pulse count and recording the latter pulses on said recording medium.

In accordance with a preferred embodiment of the invention, the above mentioned pulses are expressed as electrical pulses.

In accordance with a further preferred embodiment of the invention, the pulses are recorded.

In accordance with another preferred embodiment of the invention, the pulses are expressed as equal duration pulses and may be recorded. The recorded equal duration pulses may be reproduced at several different playback speeds.

The subject invention also resides in an information record comprising a magnetic recording tape, and pulses expressing said information recorded on said recording tape and being arranged and spatially distributed along said recording tape in accordance with the following equation:

$M_n = xn + T$, wherein: $n$ is the code number, M is the quantity of pulses per code number, T is the negative tolerance of pulse count, and $x$ is the sum of one plus the positive tolerance and the negative tolerance of pulse count.

From another aspect thereof, this invention resides in apparatus for recording information on a recording medium in an information recording and playback system wherein information pulses are erroneously deleted within a negative tolerance of pulse count of at least one and wherein spurious pulses are picked up within a positive tolerance of pulse count. More specifically, the invention according to this aspect resides in the improvement comprising, in combination, means for generating pulses expressing the information in accordance with the equation and code:

$M_n = xn + T$, wherein: $n$ is the code number, M is the quantity of pulses per code number, T is the negative tolerance of pulse count, and $x$ is the sum of one plus the positive tolerance and the negative tolerance of pulse count, and means connected to said generating means for recording said generated pulses on said recording medium.

According to a further aspect thereof, the subject invention resides in a method of wherein said information is expressed in the form of pulses recording information on and reproducing information from a recording medium in an information recording and playback system wherein information pulses are erroneously deleted within a negative tolerance of pulse count of at least one and wherein spurious pulses are picked up within a positive tolerance of pulse count, and and resides, more specifically, in the improvement comprising, in combination, arranging the pulses in accordance with the equation and code:

$M_n = xn + T$, wherein: $n$ is the code number, M is the quantity of pulses per code number, T is the negative tolerance of pulse count, and $x$ is the sum of one plus the positive tolerance and the negative tolerance of pulse count recording the latter pulses on said recording medium; reproducing said pulses from said recording medium and decoding the reproduced pulses in accordance with the function:

$M'_n/x$, wherein: M' is the quantity of pulses per code number available for decoding, $n$ is the code number, and $x$ is said sum of one plus the positive tolerance and the negative tolerance of pulse count; and recognizing only integers in the result of said division $M'_n/x$.

From yet another aspect thereof, the subject invention resides in a method of reproducing and decoding information recorded on a recording medium in an information recording and playback system wherein information pulses are erroneously deleted within a negative tolerance of pulse count of at least one and wherein spurious pulses are picked up within a positive tolerance of pulse count, and coded in accordance with the equation:

$M_n = xn + T$, wherein: $n$ is the code number, M is the quantity of pulses per code number, T is the negative tolerance of pulse count, and $x$ is the sum of one plus the positive tolerance and the negative tolerance of pulse count.

The latter method resides, more specifically, in the improvement comprising, in combination, reproducing said recorded and coded information from said recording medium, decoding said reproduced information in accordance with the function:

$M'_n/x$, wherein: M' is the quantity of pulses per code number available for decoding, $n$ is the code number, and $x$ is said sum of one plus the positive tolerance and the negative tolerance of pulse count; and recognizing only integers in the result of said division $M'_n/x$.

From a further aspect thereof, the subject invention resides in apparatus for coding and subsequently decoding information in an information processing system wherein information pulses are erroneously deleted within a negative tolerance of pulse count of at least one and wherein spurious pulses are picked up within a positive tolerance of pulse count and resides, more specifically, in the improvement comprising, in combination, means for generating pulses expressing said information in accordance with the equation and code:

$M_n=xn+T$, wherein $n$ is the code number, M is the quantity of pulses per code number, T is the negative tolerance of pulse count, and $x$ is the sum of one plus the positive tolerance and the negative tolerance of pulse count;

means for decoding said pulses in accordance with the function:

$M'_n/x$, wherein M' is the quantity of pulses per code number available for decoding, $n$ is the code number, and $x$ is said sum of one plus the positive tolerance and the negative tolerance of pulse count; and means for recognizing only integers in the result of said division $M'_n/x$.

From yet a further aspect thereof, the subject invention resides in apparatus for reproducing and decoding information in an information processing system wherein information pulses are erroneously deleted within a negative tolerance of pulse count of at least one and wherein spurious pulses are picked up within a positive tolerance of pulse count and coded in accordance with the equation:

$M_n=xn+T$, wherein $n$ is the code number, M is the quantity of pulses per code number, T is the negative tolerance of pulse count, and $x$ is the sum of one plus the positive tolerance and the negative tolerance of pulse count.

The invention according to the latter aspect resides, more specifically, in the improvement comprising, in combination, means for reproducing said recorded and coded information from said recording medium, means for decoding said reproduced information in accordance with the $M'_n/x$, wherein M' is the quantity of pulses per code number available for decoding, $n$ is the code number, and $x$ is the said sum of one plus the positive tolerance and the negative tolerance of pulse count; and means for recognizing only integers in the result of said division $M'_n/x$.

BRIEF DESCRIPTION OF THE DRAWINGS

The subject invention will become more readily apparent from the following detailed description of preferred embodiments thereof illustrated by way of example in the accompanying drawings, in which.

DESCRIPTION OF PREFERRED EMBODIMENTS

It is common in information transmitting and in information recording systems that spurious pulses are picked up and information pulses are erroneously deleted in the transmission or recording and playback process. To allow for this possibility, the subject invention places a "tolerance" so to speak on an information code. This tolerance is correlated to the expected count of spurious added pulses and the expected count of erroneously deleted information pulses.

By way of example, a positive tolerance of one may be assumed if it is expected that one pulse per code number may be picked up, while a negative tolerance of two may be assumed if two pulse dropouts are expected to be possible per code number.

Figure 1A:
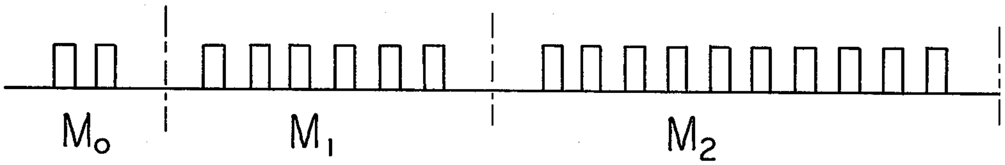
FIGS. 1*a*, 1*b*, 2*a* and 2*b* are plots of pulse-coded data in accordance with a preferred embodiment of the subject invention.
Figure 1B:
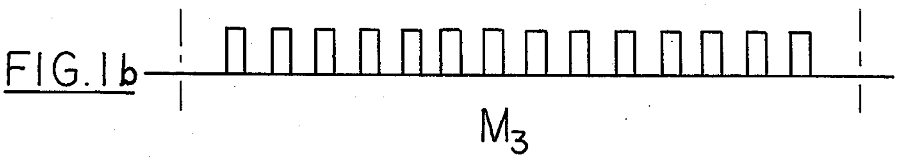

FIGS. 1*a* and 1*b* illustrate codes and coding techniques following the latter example. The code number zero is shown in FIG. 1*a* at $M_0$. That code has two pulses in the illustrated embodiment. By way of comparison, the code number one is shown in FIG. 1*a* at $M_1$.

As seen in FIG. 1*a*, the code number zero has two pulses and the code number one has six pulses. If two pulses drop out in accordance with the above mentioned example in code number zero, the number of pulses becomes zero and can thus still be correctly read as code number zero.

On the other hand, if one pulse is picked up as to code number zero, then there will be three pulses indicating the code number zero. This still adequately distinguishes the code number zero from any other code number, since even the code number one will still have four pulses if two dropouts occur in accordance with the above mentioned example.

The same applies *mutatis mutandis* to the code numbers two, three, et seq. For instance, while code number one can vary in our example from four to seven pulses, code number two can vary from eight to eleven pulses, and code number three can vary from twelve to fifteen pulses.

By way of generalization, it will be noted that the code and coding technique follow a progression that may be expressed as:

$$M_n=xn+T$$

wherein:

$n$ is the code number;

M is the quantity of pulses per code number;

T is the negative tolerance of pulse count; and $x$ is the sum of one plus the positive tolerance and the negative tolerance of pulse count.

The factors $x$ and T may be varied in accordance with the expected number of pickups and dropouts. By way of example, a digital code has been shown in FIGS. 1*a* and 1*b* to illustrate the code numbers zero, one, two, three, et seq.

Figure 2A:
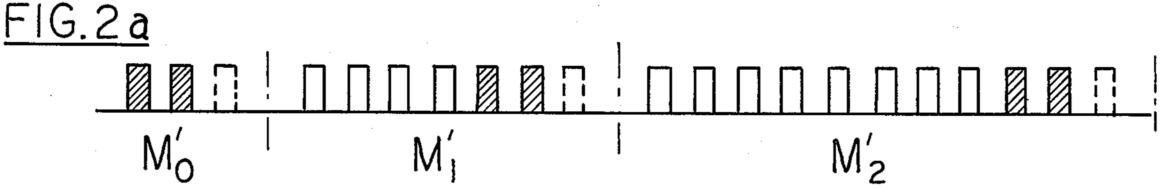
Figure 2B:
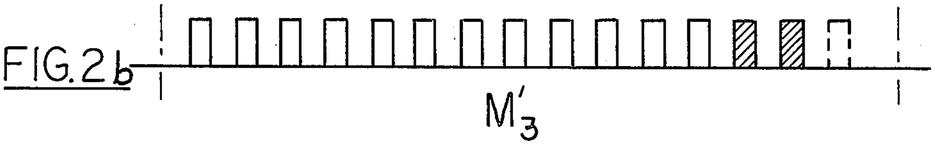

Also by way of example, FIGS. 2*a* and 2*b* show code numbers zero through three after transmission or recording and playback, with assumed positive tolerances being indicated in dotted outline and assumed negative tolerances being indicated by hatching a number of pulses corresponding to the number of assumed negative tolerances in the above mentioned example. A prime (') has in FIGS. 2*a* and 2*b* been inserted at the symbol designating the actual quantity of pulses at each code number, to indicate the fact that the actual number transmitted or reproduced is, in view of the above mentioned tolerances, not necessarily equal to the number of pulses in the originally generated code.

Figure 3:
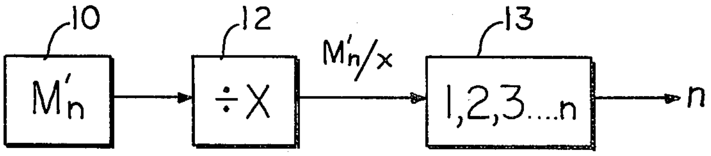
FIG. 3 is a block diagram of a decoding technique and of a decoder in accordance with a preferred embodiment of the subject invention.

FIG. 3 illustrates a decoding method and a decoding apparatus for decoding the coded information in accordance with a further aspect of the subject invention.

According to FIG. 3, each term (code number) of the transmitted or reproduced code words is divided by $x$, being the above mentioned sum of one plus the positive tolerance and the negative tolerance of pulse count. To this end, FIG. 3 shows a block 10, designating the received or reproduced terms (code numbers) or means for receiving or reproducing such terms, and a block 12 indicating the above mentioned division by $x$ or representing means for effecting such division.

FIG. 3 shows the result of the latter division between block 12 and a block 13 as $M'_n/x$. The block 13 shows a technique or means for recognizing only integers in the latter result. In terms of equipment, the block 13 may include a binary counter which by nature recognizes only integer quantities.

As shown in FIG. 3, the result of the operation of block 13 is an indication of the code number of each received or reproduced term. Following our above mentioned example, we may again assume that $x$ is equal to four. Since the maximum number of pulses for $M'_0$ is three, and since block 13 recognizes only integers, it follows that $n$ for $M'_0$ is always zero, assuming $x$ to be four in the above mentioned example. Similarly, $n$ for $M'_1$ will always be one; $n$ for $M'_2$ will always be two; $n$ for $M'_3$ will always be three; and so forth, as may be seen with the aid of FIGS. 2*a* and 2*b*.

Figure 4:
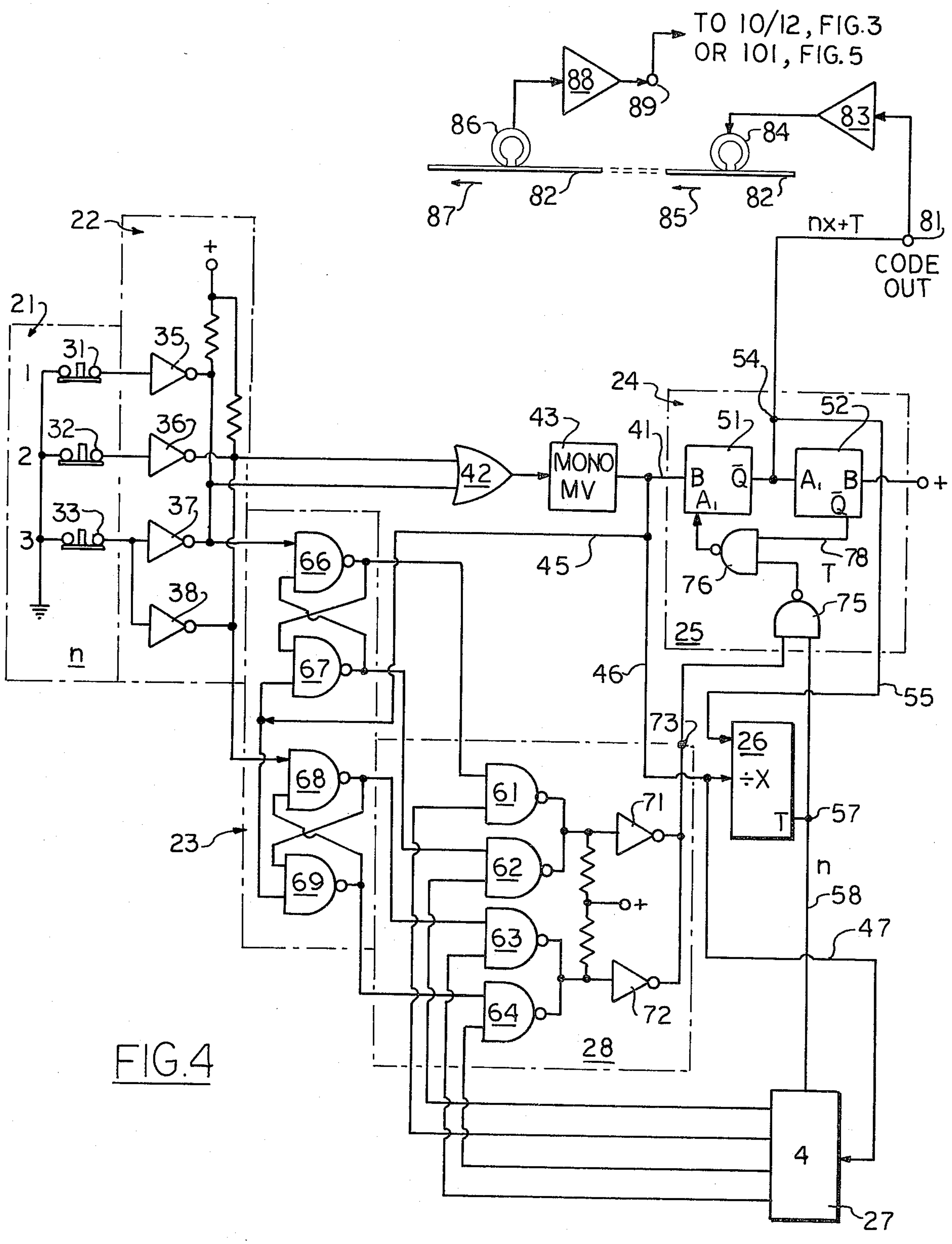
FIG. 4 is a schematic of a data encoder in accordance with a preferred embodiment of the subject invention, together with a diagrammatic showing of data recording and playback processes.

An apparatus for encoding information in accordance with a preferred embodiment of the subject invention is disclosed with the aid of the diagram shown in FIG. 4.

Broadly, the apparatus of FIG. 4 has a code selector 21, an encoder 22, a register 23, a code oscillator 24, a NAND gate circuit 25 providing the above mentioned negative tolerance T, a counter 26, a counter 27 corresponding to the register 23, and a digital comparator 28 connected to the register 23 and counter 27.

The code selector 21 has a number of normally closed switches 31, 32 and 33 for selecting a desired code number n. In practice, a larger number of such switches is typically provided in the code selector to give the operator a wider choice among available code numbers.

Actuation or opening of the switches 31, 32 and 33 operates the encoder 22 which comprises a number of inverters 35, 36, 37, and 38, which provide coded data corresponding to the code numbers selected by operation of the code selector 21. These coded data are stored in the register 23. It will be recognized that the encoder 22 is of the so-called "one out of $n$ to binary" type.

The encoder 22 also provides a start signal for the code oscillator 24 at a start signal input 41 with the aid of an OR element 42 having its inputs connected to the outputs of the inverters 35 to 38, and a monostable multivibrator 43 having an input connected to the output of the OR element 42 and having its output connected to the code oscillator start signal input 41. The monostable multivibrator 43 has its output also connected to reset lines 45, 46, and 47 for clearing the register 23, the counter 26, and the counter 27 preparatory to an encoding operation.

The code oscillator 24 has two monostable multivibrators 51 and 52 for generating a series of pulses upon receipt of a start signal through the input 41. The object of the apparatus shown in FIG. 4 is to have these pulses arranged in accordance with the above mentioned equation $M_n=xn+T$.

To this end, an output 54 of the code oscillator 24 is connected by a line 55 to an input of the counter 26.

The function of the counter 26 is to divide by $x$ the pulses received from the code oscillator 24 via the line 55.

It will be recalled at this juncture that $x$ has been defined above as the sum of one plus the positive tolerance and the negative tolerance of pulse count. If $x$ is equal to four as in our above mentioned example, then the counter 26 is a binary counter of four.

The counted pulses appear at the output 57 of the counter 26 and correspond to the code number selected by the selector 21. A line 58 applies these pulses to a counter 27 which corresponds to the register 23. In the illustrated example, a digital counter of four has been shown at 27, since there are only three switches in the illustrated code selector 21. In practice, more counting stages are, of course, employed at 27 as the number of switches in the code selector 21 is increased.

The outputs of the stages of the counter 27 are connected to a number of NAND elements 61, 62, 63 and 64 of the digital comparator 28. Similarly, the outputs of the stages of the register 23 are connected to the NAND elements 61 to 64. In the illustrated example, the register 23 is composed of two flip-flop elements comprising NAND elements 66 and 67, and 68 and 69, respectively. As with the counter 27, the number of stages in the register 23 is increased in accordance with an increase in the number of switches in the code selector 21.

The NAND elements 61 to 64 in the digital comparator 28 are connected to inverters 71 and 72. These inverters provide a signal at an output 73 when the contents of the register 23 and counter 27 are equal.

The output 73 of the digital comparator 28 is connected to an input of a NAND element 75 which has its other input connected to the output 57 of the counter 26. The output of the NAND element 75 is connected to an input of a NAND element 76 which is located in a feed-back path 78 of the code oscillator 24, such as between a $\bar{Q}$ output of the multivibrator 52 and an input $A_1$ of the multivibrator 51. The components 43, 51 and 52 may, for instance, include multivibrators of the type SN74121 shown in the Integrated Circuit Catalog CC-401, pp. 6–76 to 6–78, by Texas Instruments.

Upon energization by an output signal of the digital comparator 28 and an output signal of the counter 26, the NAND element circuit 25 provides the above mentioned addend T, representing the negative tolerance of pulse count and being equal to two in our above mentioned example.

In consequence, the pulse count appearing at the output 81 of the encoder is equal to $nx+T$.

In accordance with the illustrated preferred example shown in FIG. 4, the pulses or encoded information generated at the output 81 is recorded on magnetic tape 82 by means of a recording amplifier 83 and a magnetic recording head 84. Conventional tape drive means (not shown) are employed to advance the tape 82 in the direction of an arrow 85 relative to the recording head 84. Any other suitable kind of recording medium may, of course, be employed as desired.

The recording tape 82 is subsequently advanced past a magnetic playback head 86 in the direction of the arrow 87. A playback amplifier 88 amplifies the code pulses picked up by the head 86 and applies the amplified pulses to a terminal 89. As indicated in FIG. 4, the terminal 89 may be connected to the block 10 or directly to the block 12 in FIG. 3 for decoding of the played-back information in the manner described above.

In accordance with a preferred embodiment of the subject invention, the encoder shown in FIG. 4 provides equal duration pulses. This permits the coded information to be recorded and reproduced at different relative recording and playback speeds and in either direction of tape advance.

The utility of the subject invention is vast; data storage, transmission, recording and playback, and processing having been mentioned above by way of example. In the course of a practical application, the techniques and equipment of the subject invention have been employed to record coded commands on magnetic tape in an audio-visual display system in which the display process was controlled by these recorded commands. Owing to the operation of the subject invention in the manner disclosed above, proper functioning of the audio-visual display was preserved despite pulse dropouts and pickups within the provided tolerances.

Figure 5:
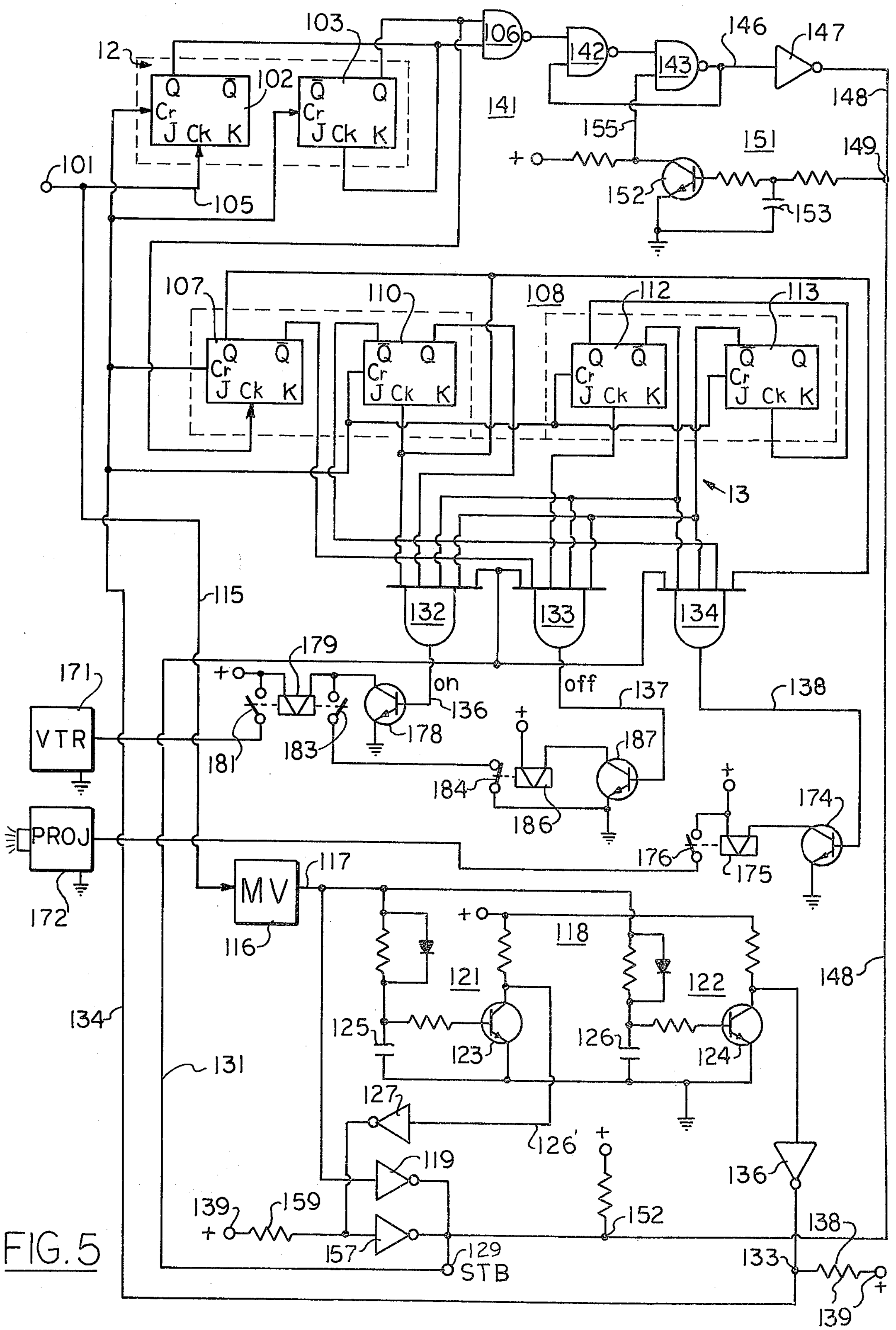
FIG. 5 is a schematic of a data decoder in accordance with a preferred embodiment of the subject invention.

A specific circuit diagram of a decoder in accordance with a preferred embodiment of the subject invention, for decoding the encoded data of the subject invention, is shown in FIG. 5. This figure also shows circuitry for actuating equipment in response to coded data.

The decoder of FIG. 5 has a coded data input 101 which may, for instance, be connected to the terminal 89 of the playback amplifier shown in FIG. 4, so as to receive the played-back data. This data is coded as described above in accordance with the subject invention. In accordance with the block diagram of FIG. 3, the decoder of FIG. 5 has a binary counter 12 for dividing the received data by $x$ as defined above. In our specific examples herein given, $x$ is equal to four, so that the counter 12 may be a binary counter of four.

By way of example, the counter 12 may be composed of dual J-K master-slave flip-flops 102 and 103. Further by way of example, the dual flip-flops 102 and 103 may be of the type SN 7473, as shown, for instance, in the Integrated Circuit Catalog CC-401, pp. 6–52 to 6–54, by Texas Instruments.

The coded data received at the input terminal 101 is applied by a lead 105 to the clock input of the flip-flop element 102. The Q output of the element 102 is connected to the clock input of the flip-flop element 103 and to an input of a NAND element 106. The Q output of the flip-flop element 103 is connected to the other input of the NAND element 106 and to the clock input of a J-K master-slave flip-flop element 107.

The flip-flop element 107 is part of a sixteen counter 108 composed of dual J-K master-slave flip-flops 107 and 110, and dual J-K master-slave flip-flops 112 and 113, which may all be of the same type as the above mentioned dual flip-flops 102 and 103.

A line 115 is connected to the input terminal 101 and the line 105 in order to apply the received coded data to a multivibrator 116. By way of example, the component 116 may be a retriggerable monostable multivibrator with clear, type SN 74122 shown, for instance, in the Integrated Circuit Catalog CC-401, pp. 6–79 and 6–80, by Texas Instruments.

The multivibrator 116 provides a high pulse, the duration of which corresponds to the duration of a received coded pulse train or word (see FIGS. 1*a* and *b*). The Q output 117 of the multivibrator 116 is connected to a dual-end delay circuit 118, and also to an inverter 119.

The delay circuit 118 includes delay elements 121 and 122 having each a transistor 123 and 124 and a storage capacitor 125 and 126, respectively.

The output 126' of the delay element 121 is connected to an inverter 127. The delay element 121 functions to stretch the end of the output pulse of the multivibrator 116, in order to enable to provision of a strobe pulse at a terminal 129, as more fully described below. The strobe pulse is applied by a lead 131 to inputs of AND elements 132, 133, and 134, which have other inputs connected to the J-K flip-flop elements 107, 110, 112 and 113, as shown in FIG. 5. The AND elements 132 to 134 cooperate with the sixteen counter 108 to decode the played-back or received data.

In the illustrated example, the AND element 132 provides a high signal at its output 136 in response to the above mentioned code 3. The AND element 133 provides a high signal at its output 137 in response to the code 2, and the AND element 134 provides a high signal at its output 138 in response to the code 1. To enable the decoder to perform its function, a clear signal is generated at a terminal 133 and is applied via a line 134 to the clear inputs of the flip-flop elements 102, 103, 107, 110, 112, and 113. To this end, the output of the delay element 122 is connected to an inverter 136. The terminal 133 is located between the inverter 136 and a resistor 138 which, in turn, is connected to the positive terminal 139 of a power supply (not shown).

The capacitance of the capacitor 126 of the delay element 122 is larger than the capacitance of the capacitor 125 of the delay element 121 (such as twice as large) to postpone the occurrence of the clear signal at the terminal 133 to beyond the occurrence of the strobe pulse at the terminal 129.

The decoder of FIG. 5 further is provided with a latch 141 which includes the above mentioned NAND element 106 and two further NAND elements 142 and 143. The NAND element 142 has its inputs connected to the outputs of the NAND elements 106 and 143. The output of the NAND element 142 is connected to an input of the NAND element 143.

Data from the latch 141 is applied by a lead 146 to an inverter 147. The output of the inverter applies a reset signal via a lead 148 to an input terminal 149 of a delay circuit 151, and also to a terminal 152 near the bottom of FIG. 5. The delay circuit 151 includes a transistor 152 and a storage capacitor 153 and serves the purpose of delaying the occurrence of the reset signal until the above mentioned clear signal occurs in the decoder of FIG. 5. To this end, the transistorized delay circuit 151 has an output 155 connected to the other input of the NAND element 143.

The output of the above mentioned inverter 127 is connected to the input of an inverter 157 whose output is connected to the strobe terminal 129, along with the outputs of the previously mentioned inverters 119 and 147. The input of the inverter 157 is further connected to a resistor 159 which, in turn, is connected to the previously mentioned positive terminal 139 of the power supply.

The inverters herein shown, and particularly the inverters 119, 147 and 157 are of the well-known open collector output TTL logic type. Accordingly, these three inverters constitute a so-called "wired OR" element, in which all three of the inverters 119, 147 and 157 have to have a high output for the strobe signal to occur at the terminal 129. In this manner, the decoder shown in FIG. 5 is able to distinguish at the AND element outputs 136, 137 and 138 between different received code numbers.

By way of example, let us assume that the objective of the illustrated equipment is to actuate a video tape recorder 171 and a slide projector 172 in response to the recorded and played-back codes.

In response to code 1, the output of the AND element 134 causes a transistor 174 to energize a relay 175 which, in turn, closes a contact 176 for advancing the projector 172 to the next slide, by means of a conventional electromagnetic slide changing mechanism (not shown) in the projector 172. This projector thus changes a slide every time code 1 is played back.

In response to a playback of code 3, the AND element 132 causes a transistor 178 to energize a relay 179 which closes its contact 181 in order to start the video tape recorder 171 for a playback and display of a video or television program from a recording tape or disc by means of conventional equipment (not shown). The relay 179 has a self-holding circuit including contacts 183 and 184. The contact 183 is closed by the energized relay 179 and the contact 184 is normally closed, so that the relay 179 remains energized and the video tape recorder 171 continues to operate until the contact 184 is opened by a relay 186.

The relay 186 is energized by a transistor 187 in response to playback of code 2. In that case, the AND element 133 provides an off signal at its output 137. This causes the transistor 187 to energize the relay 186, thereby opening the contact 184, so that the relay 179 is deenergized and the video tape recorder is accordingly turned off pending receipt of the next on signal from the AND element 132 in response to code 3.

In this manner, the recorded code from the tape 82 shown in FIG. 4 is able to control the operation of the video tape recorder 171 and the projector 172 in a training or teaching system, or in other display equipment.

Modifications and variations within the spirit and scope of the invention will become apparent from the subject disclosure to those skilled in the art.

We claim:

1. In a method of recording information on a recording medium in an information recording and playback system wherein information pulses are erroneously deleted within a negative tolerance of pulse count of at least one and wherein spurious pulses are picked up within a positive tolerance of pulse count, and wherein said information is expressed in the form of pulses, the improvement comprising the steps of:

arranging said pulses in accordance with the equation and code:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count; and recording the latter pulses on said recording medium.

2. A method as claimed in claim 1, wherein: said pulses are expressed as electrical pulses.

3. A method as claimed in claim 1, wherein: said pulses are expressed as equal duration pulses.

4. A method as claimed in claim 3, wherein: said recorded equal duration pulses are reproduced at several different playback speeds.

5. In apparatus for recording information on a recording medium in an information recording and playback system wherein information pulses are erroneously deleted within a negative tolerance of pulse count of at least one and wherein spurious pulses are picked up within a positive tolerance of pulse count, the improvement comprising in combination:

means for generating pulses expressing said information in accordance with the equation and code:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count; and means connected to said generating means for recording said generated pulses on said recording medium.

6. An apparatus as claimed in claim 5, wherein: said pulse generating means include means for generating electrical pulses.

7. An apparatus as claimed in claim 5, wherein: said pulse generating means include means for generating equal duration pulses.

8. An apparatus as claimed in claim 7, including: means for reproducing said equal duration pulses from said recording medium at several different playback speeds.

9. In a method of recording information on and reproducing information from a recording medium in an information recording and playback system wherein information pulses are erroneously deleted within a negative tolerance of pulse count of at least one and wherein spurious pulses are picked up within a positive tolerance of pulse count and wherein said information is expressed in the form of pulses, the improvement comprising in combination:

arranging said pulses in accordance with the equation and code:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count;

recording the latter pulses on said recording medium;

reproducing said pulses from said recording medium and decoding said reproduced pulses in accordance with the function:

$$M'_n/x$$

wherein:

$M'$ is the quantity of pulses per code number available for decoding;

$n$ is the code number; and $x$ is said sum of one plus the positive tolerance and the negative tolerance of pulse count; and recognizing only integers in the result of said division $M'_n/x$.

10. A method as claimed in claim 9, wherein: said arranged pulses are transmitted prior to said decoding.

11. A method as claimed in claim 9, wherein: said pulses are expressed as equal duration pulses.

12. In a method of reproducing and decoding information recorded on a recording medium in an information recording and playback system wherein information pulses are erroneously deleted within a negative tolerance of pulse count of at least one and wherein spurious pulses are picked up within a positive tolerance of pulse count and coded in accordance with the equation:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count;

the improvement comprising in combination:

reproducing said recorded and coded information from said recording medium;

decoding said reproduced information in accordance with the function;

$$M'_n/x$$

wherein:

$M'$ is the quantity of pulses per code number available for decoding;

$n$ is the code number; and $x$ is said sum of one plus the positive tolerance and the negative tolerance of pulse count; and recognizing only integers in the result of said division $M'_n/x$.

13. In apparatus for coding and subsequently decoding information in an information processing system wherein information pulses are erroneously deleted within a negative tolerance of pulse count of at least one and wherein spurious pulses are picked up within a positive tolerance of pulse count, the improvement comprising in combination:

means for generating pulses expressing said information in accordance with the equation and code:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count;

means for decoding said pulses in accordance with the function:

$$M'_n/x$$

wherein:

$M'$ is the quantity of pulses per code number available for decoding;

$n$ is the code number; and $x$ is said sum of one plus the positive tolerance and the negative tolerance of pulse count; and means for recognizing only integers in the result of said division $M'_n/x$.

14. An apparatus as claimed in claim 13, including: means for recording and reproducing said arranged pulses prior to decoding.

15. An apparatus as claimed in claim 13, including: means for transmitting said arranged pulses prior to decoding.

16. An apparatus as claimed in claim 13, wherein: said pulse generating means include means for generating equal duration pulses.

17. In apparatus for reproducing and decoding information recorded on a recording medium in an information recording and playback system wherein information pulses are erroneously deleted within a negative tolerance of pulse count of at least one and wherein spurious pulses are picked up within a positive tolerance of pulse count, and coded in accordance with the equation:

$$M_n = xn + T$$

wherein:

$n$ is the code number;

M is the quantity of pulses per code number;

T is the negative tolerance of pulse count; and $x$ is the sum of one plus the positive tolerance and the negative tolerance of pulse count;

the improvement comprising in combination:

means for reproducing said recorded and coded information from said recording medium;

means for decoding said reproduced information in accordance with the function:

$$M'_n/x$$

wherein:

$M'$ is the quantity of pulses per code number available for decoding;

$n$ is the code number; and $x$ is said sum of one plus the positive tolerance and the negative tolerance of pulse count; and means for recognizing only integers in the result of said division $M'_n/x$.

* * * * *